McBURNEY & FORSYTH.
Car Spring.
No. 53,999.  Patented Apr. 17, 1866.
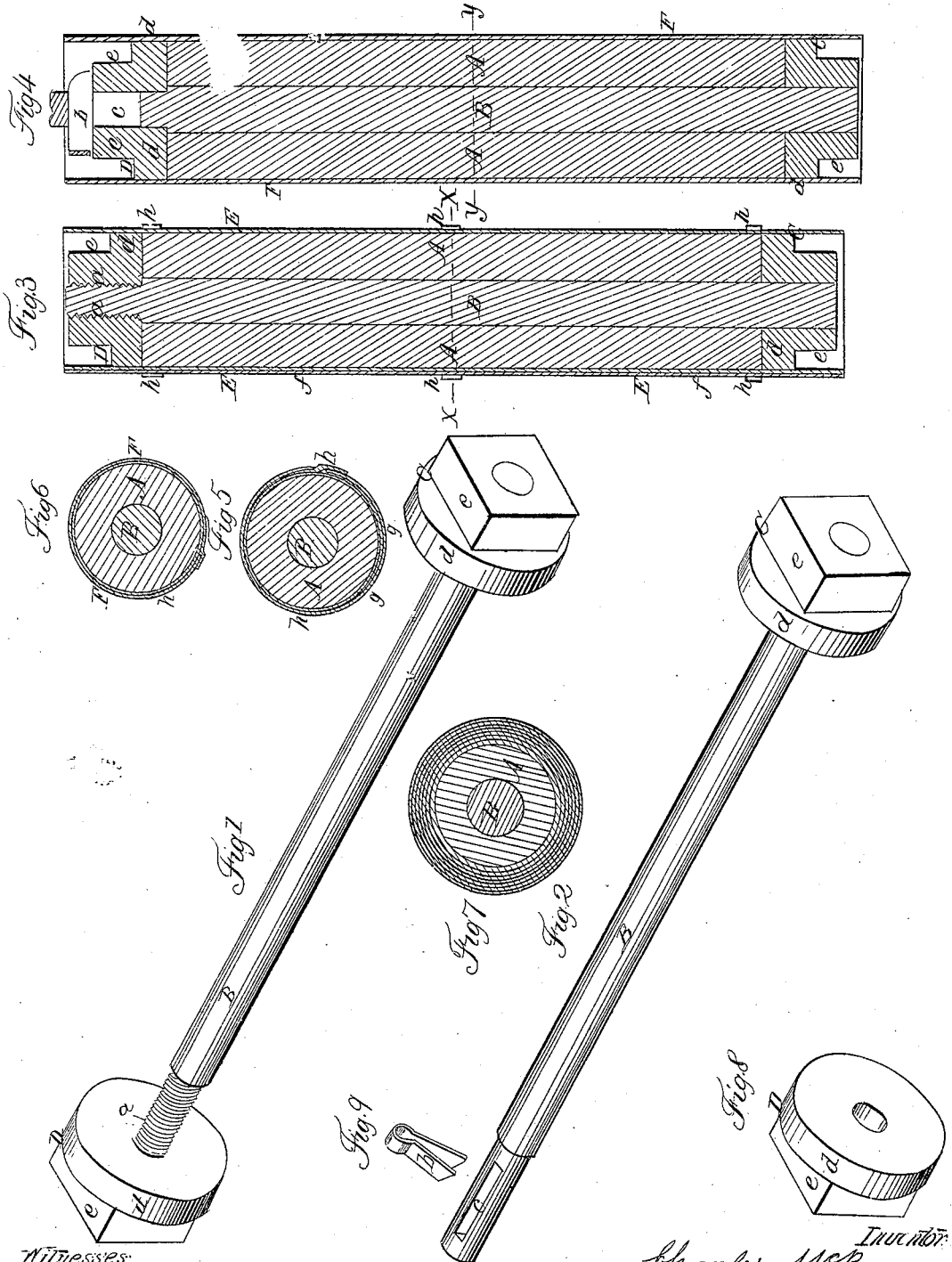

UNITED STATES PATENT OFFICE.

CHARLES McBURNEY AND JAMES B. FORSYTH, OF ROXBURY, MASS.

IMPROVEMENT IN THE MANUFACTURE OF INDIA-RUBBER TUBES, &c.

Specification forming part of Letters Patent No. 53,999, dated April 17, 1866.

*To all whom it may concern:*

Be it known that we, CHARLES MCBURNEY and JAMES B. FORSYTH, of Roxbury, in the county of Norfolk and State of Massachusetts, have invented certain new and useful Improvements in the Manufacture of Rolls, Tubes, Springs, and other Articles of Rubber or of Similar Material, of which the following is a full, clear, and exact description, reference being had to the accompanying drawings, making part of this specification, in which—

Figures 1 and 2 are perspective views of the improved mandrels which we employ in the vulcanizing process. Fig. 3 is a central longitudinal section representing a wringer-roll secured in place upon a mandrel provided with a screw-thread, the roll being placed within a flask of sheet metal ready to be vulcanized. Fig. 4 is a central longitudinal section through a wringer-roll upon a mandrel provided with a slot to receive a key, the roll being surrounded by a tube of sheet metal ready to be vulcanized. Fig. 5 is a cross-section on the line $x\,x$ of Fig. 3. Fig. 6 is a cross-section on the line $y\,y$ of Fig. 4. Fig. 7 is a cross-section through a roll upon a mandrel, the roll having a strip of sheet metal simply wrapped around it, and the metal being afterward bound with cloth. Figs. 8 and 9 are details to be referred to.

It was formerly the custom in making rolls, tubes, springs, and other articles of rubber or similar material to wind it in sheets around a long mandrel, and tie or otherwise secure it to each end of the mandrel, when the roll thus formed was wrapped in cloth and placed within the heater or vulcanizing receptacle, and on removing it therefrom, after being vulcanized, it was cut into pieces of the required length. This method was objectionable for the reason that as the material became soft and plastic by the vulcanizing process the weight of mandrel upon the material under it caused it to yield, and consequently the circular hole formed by the mandrel, and originally made in the center of the tube, was found, after vulcanization, to be eccentric with it, being nearer that portion of its periphery which rested upon the heater. The hole was often so much out of the center of the tube that when cut into pieces of the required length many of them were not only unfit for the purpose intended, but also of little or no value to be again worked over. More or less of the ends of the tube were also wasted from the same cause.

The roll has also been cut of the proper length and placed inside a thick cast-iron mold or flask, and a mandrel then passed through the hole formed in the center of the roll; but, on account of the inconvenience of handling the heavy flasks, and the difficulty of placing the article therein and removing it therefrom, this method was slow and expensive.

The object of our invention is to overcome the above-mentioned objections; and it consists in a short mandrel provided with heads, one or both of which are made removable, a portion of each head being of a circular form and of the same diameter as that required for the article after being vulcanized, cloth or thin sheet metal, or both, being employed as a wrapping to bind around the article during the vulcanizing process, and the circular portions of the heads resting upon the wrappings and supporting the weight of the mandrel, whereby the exact length and diameter of the article are determined, while the position of the hole originally formed by the long mandrel is accurately retained in the exact center of the finished article.

To enable others skilled in the art to understand and use our invention, we will proceed to describe the manner in which we have carried it out.

In the said drawings, A represents a rubber wringer-roll cut from a long roll formed by winding the material in sheets around a mandrel of considerable length, the long roll thus formed being divided into lengths a little exceeding the required length of the article when finished, in order to allow for shrinkage occasioned by its removal from the mandrel after the vulcanizing process.

B is a short metallic shaft or mandrel of the same diameter as that required for the hole formed in the center of the roll when finished. This mandrel B is provided at one extremity with a stationary head, C, and at its opposite extremity with a screw-thread, $a$, (see Figs. 1 and 3,) upon which turns a head or nut, D, having a corresponding screw-thread cut therein. Instead of the head D being secured to the mandrel by means of the screw-thread $a$, it may be kept in place thereon after adjustment by means of a key, b, Figs. 4 and 9, fitting into a slot, c, Figs. 2 and 4, formed in the mandrel, the slot c being of sufficient length to receive keys of different widths in order that the same mandrel may be used to receive articles of various lengths. A portion, d, of each head is of a circular form, (for a purpose presently to be described,) and a portion, e, square or rectangular, so that it may be grasped in a vise or by a wrench when required to remove the head for the purpose of removing the article from the mandrel after being vulcanized.

E is a flask of any suitable thin metal, provided with a longitudinal strip, f, which projects over the ends g, Fig. 5, of the flask when brought together to inclose the roll to be vulcanized, the flask being snugly bound around the roll by flat bands or rings h, Figs. 3 and 5, which are readily displaced when it is desired to remove the roll after being vulcanized. The ends g of the sheet metal may be soldered together, thus forming a tube, F, (see Figs. 4 and 6,) into which the article may be placed, or it may be simply wrapped with sheet metal, which is bound with cloth to prevent it from unfolding, as seen in Fig. 7.

Operation: The long roll, formed as above described, being cut up into suitable lengths, each piece to be vulcanized is placed upon a mandrel, B, and the head D secured in place by the screw-thread a, or by a key, b, of the proper width, fitting into the slot c, after which the roll is wrapped in cloth or metal, or both, as will now be explained, preparatory to being placed in the vulcanizing receptacle.

Where the sheet metal is to be employed as a wrapping, and where the material to be vulcanized is of a very expansive nature, it may first be wrapped with cloth and afterward with sheet metal, the cloth facilitating the escape of the gas, thereby reducing the amount of pressure and requiring less of the sheet metal to be employed as a wrapping. Sheet metal may be first wrapped around the roll, and cloth be afterward bound around the sheet to prevent its unwinding. When the surface of the roll is required to be finished smooth it is placed within a flask or tube, or wrapped in sheet metal without being first covered with cloth. When the tube is used, however, the diameter of the article must either exactly conform to it, or, if the material be of a very expansive nature, the diameter of the tube may be a trifle greater than that of the article to allow room for its expansion during the vulcanizing process.

After being wrapped, as above described, the roll is placed within the heater, the circular portions d of the heads C D supporting the weight of the mandrel, so that, as the material is rendered soft and plastic by the heat, the exact length of the roll is determined by the distance between the inner surfaces of the heads C D, while the diameter of the roll is exactly that of the circular portions d of the heads, and the hole remains accurately fixed in the center of the roll after being removed from the heater. The square portion e of the adjustable head D is then secured in a vise, or a wrench applied thereto, and the other end of the roll turned so as to loosen the head D, which is now taken off and the roll readily removed from the mandrel.

Instead of but one head being made removable, as described, both heads may be so made without departing from the spirit of our invention; but we find it more convenient in practice to remove but one head.

What we claim as our invention, and desire to secure by Letters Patent, is—

1. The mandrel B, with its heads C D, one or both being made removable, substantially as and for the purpose set forth.

2. In combination with the above, the employment of sheet metal in any form as a wrapping for the article while being vulcanized, substantially as described.

CHARLES McBURNEY.
JAMES B. FORSYTH.

Witnesses:
P. E. TESCHEMACHER,
N. W. STEARNS.